Dec. 31, 1946. C. S. HULTON 2,413,499
UNIT DUST COLLECTOR
Filed April 7, 1945 3 Sheets-Sheet 1

INVENTOR.
Charles S. Hulton
BY
Murray, Sackhoff & Paddack
ATT'YS

Dec. 31, 1946.    C. S. HULTON    2,413,499
UNIT DUST COLLECTOR
Filed April 7, 1945    3 Sheets-Sheet 3

INVENTOR.
Charles S. Hulton
BY
Murray, Sackhoff & Paddack
ATT'YS

Patented Dec. 31, 1946

2,413,499

UNITED STATES PATENT OFFICE 2,413,499

UNIT DUST COLLECTOR

Charles S. Hulton, Cincinnati, Ohio, assignor to The Kirk & Blum Manufacturing Company, Cincinnati, Ohio, a corporation of Ohio Application April 7, 1945, Serial No. 587,114

9 Claims. (Cl. 183—36)

The present invention relates to unit dust collectors adapted for use in connection with one or several dust producing machines where a large system of dust collector trunk and branch pipes is undesirable or unnecessary.

An object of the invention is to provide a unit dust collector which occupies a minimum of floor space and which may be housed under a very low work shop ceiling.

A further object of the invention is to provide a unit of this type which is exceptionally efficient as well as extremely compact.

A further object of the invention is to provide a primary dust separator housed within and operatively connected to a simple and inexpensive dust filter of large capacity whereby to usefully employ all of the space occupied by the device.

Still another object of the invention is to provide a device of this character that is arranged for easy and automatic cleansing of the secondary dust filter and for the return of accumulated secondary dust to the primary separator for ultimate deposit in the main waste receptacle without the necessity of shutting off the air flow through the device.

These and other important objects are attained by the means and method herein described and exemplified in the accompanying drawings in which.

Figure 1:
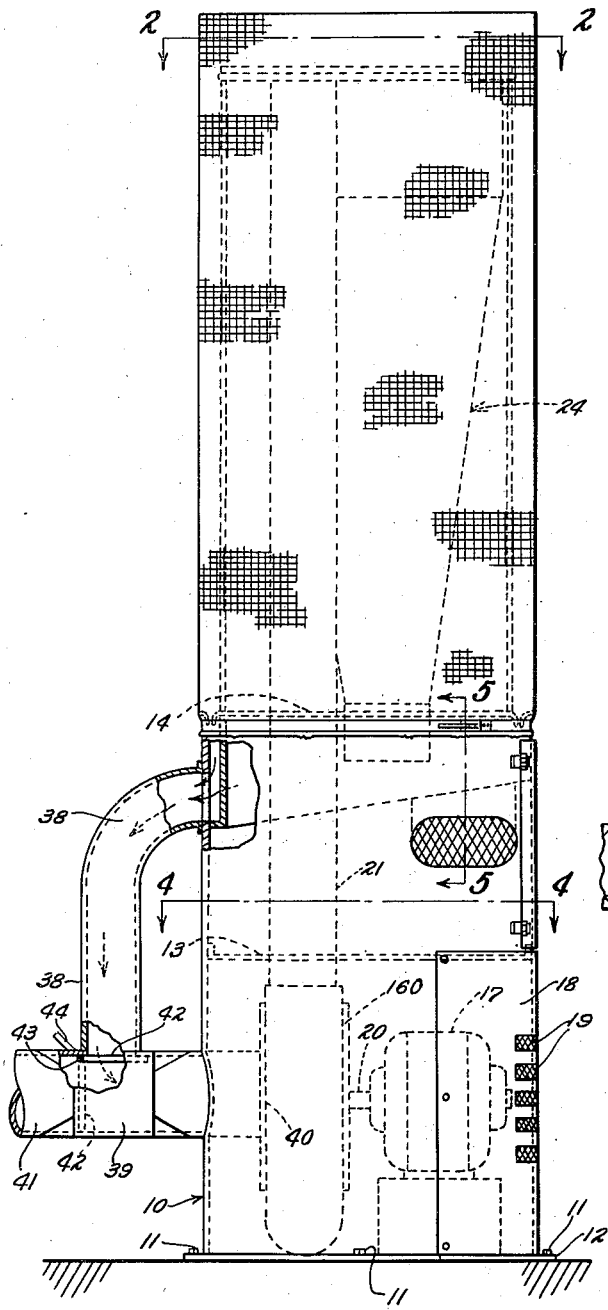
Fig. 1 is an elevational view of a unit embodying the invention.
Figure 2:
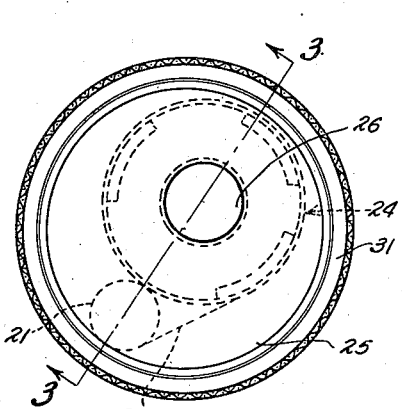
Fig. 2 is a cross-sectional view taken on line 2—2 of Fig. 1.
Figure 4:
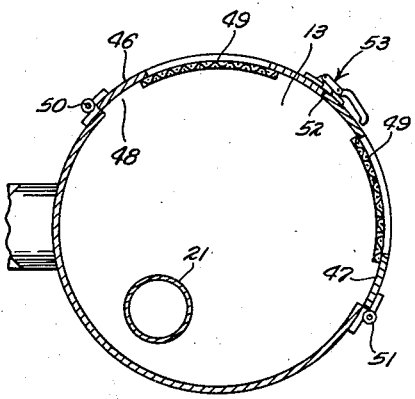
Fig. 4 is a cross-sectional view taken on line 4—4 of Fig. 1.

The unit dust collector of the invention as herein embodied comprises a base 10 suitably arranged for securing to the floor by means of bolts 11 passing through a base flange 12, and said base 10 preferably takes the form of a rigid cylindrical housing of sheet metal having an intermediate bulkhead 13 and top bulkhead 14 defining, within the base, a lower compartment 15 and an upper compartment 16. The lower compartment 15 houses a suitably mounted suction fan 160 and an electric motor 17 connected thereto. Compartment 15 is closed by a removable panel 18 with suitable screened ventilating slots 19. The motor is desirably connected directly to the fan by a shaft 20. The outlet conduit 21 of the fan extends vertically upwardly through a hole in the intermediate bulkhead 13 and thence through a registering hole in the top bulkhead 14 and upwardly therefrom to an elbow or turn 22 which connects tangentially with the circumference of the upper cylindrical portion 23 of a centrifugal dust separator indicated generally as 24. The horizontal top 25 of the centrifugal separator 24 is a circular plate through which the air outlet 26 of said primary separator opens. Plate 25 is disposed concentrically with the base 10 and the outlet opening 26 and also the fan discharge conduit 21 are thus eccentrically positioned with respect to plate 25. The primary separator 24 has its dust outlet 27 extending through a hole in the top bulkhead 14 and its inverted truncated conical portion 28 is rigidly supported intermediate its top and bottom by means of a truncated conical brace member 29.

Figure 3:
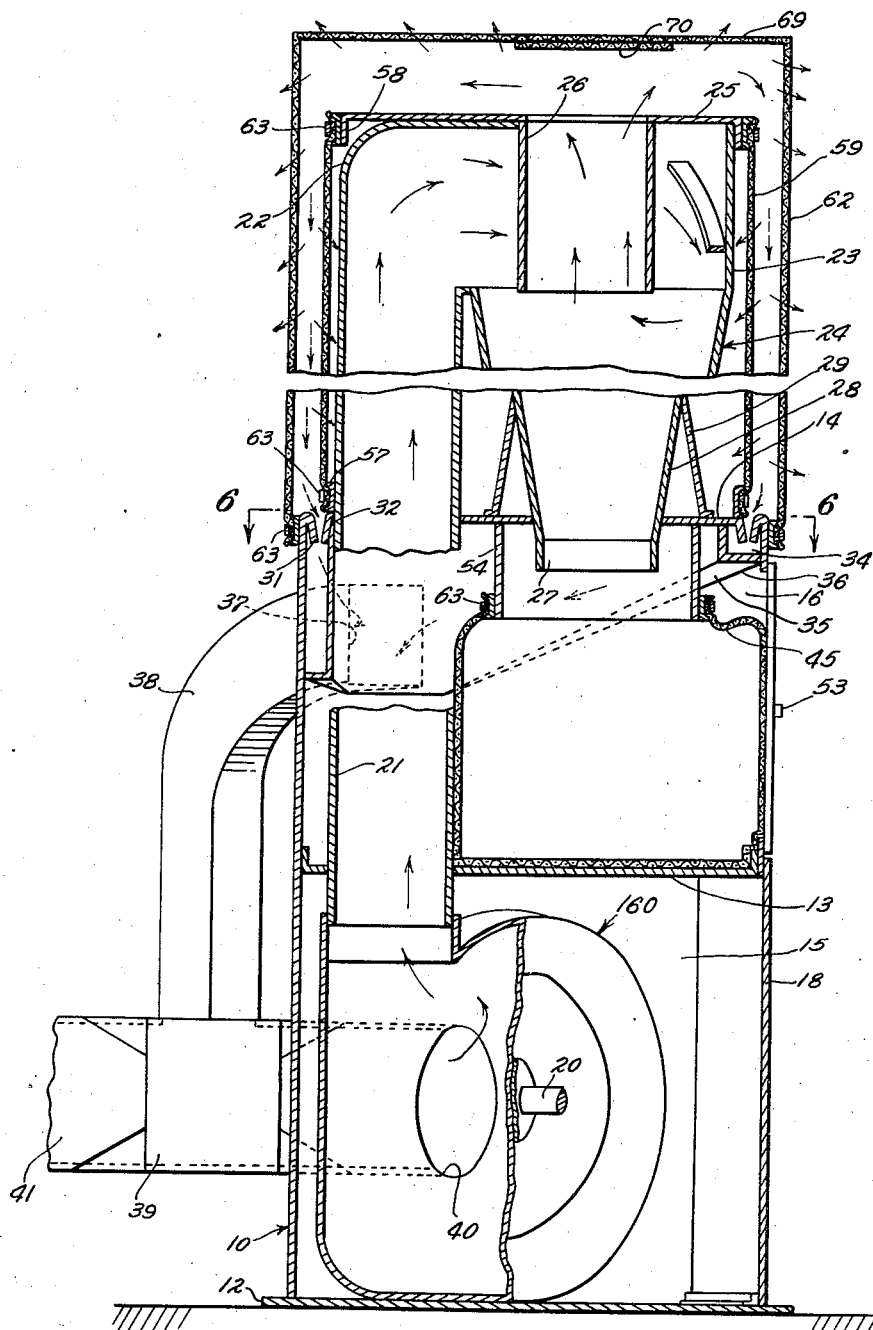
Fig. 3 is a cross-sectional view taken on line 3—3 of Fig. 2, part being broken away.

It will be understood that the connections between the several metal parts may be secured by spot welding or other known means as desired. The top bulkhead 14 is arranged to provide a narrow circumferential cleaning slot 30 having sharply inclined side walls 31 and 32, the former of which is provided by a downturned lip on the casing 10 while the latter is constituted by an opposed downturned lip or flange on the bulkhead. The bulkhead is supported from beneath and inside the flange 32 by the top edge of wall 33 of a cleaning channel 34 into which the slot empties. The bottom wall 35 of cleaning channel 34 is welded to the inner circumference of base 10 and thus forms a rigid connection to and support for the top bulkhead 14. Cleaning channel 34 is of uniform width and extends entirely around the inside of the base. The bottom wall 35 of channel 34 inclines in both directions from one point 36 so that the capacity of the channel increases around the circumference to a directly opposite point where the channel 34 connects with a cleaning outlet port 37 from which a rectangular pipe connection 38 extends outwardly and downwardly to a rectangular valve chamber 39 which communicates at one side with the fan casing suction inlet 40. Any desired dust producing machine (not shown) is connected by suitable pipe such as 41 to the opposite side of valve chamber 39. A valve damper 42 is pivoted as at 43 so that it may be selectively moved by external valve lever 44 to assume a normal position as shown in full lines in Fig. 3 wherein communication between cleaning channel 34 and the suction fan is completely cut off so that the suction from a waste producing machine passes through the fan and through outlet pipe 21 and into the primary dust separator 24 in the normal manner.

The primary dust separator is of relatively small diameter and is highly efficient so that all of the heavy materials and a very high percentage of the fine dust brought in through pipe 41 will be dropped through the dust outlet port 27 of the separator and into a receptacle 45 in the upper compartment 16 of the base. In the present embodiment the upper compartment has a pair of doors 46 and 47 jointly governing a large door opening 48 in the upper compartment, said doors having screen ventilating openings 49 therein and being hinged at the sides 50 and 51 of the opening. The free edges of the doors 46 and 47 meet at 52 and are retained in closed position by a latch structure 53, the complementary parts of which are carried by the respective doors. In the present embodiment the waste receptacle 45 is a bag of heavy filter cloth the mouth of which is releasably connected over the mouth of a depending circular flange 54 which surrounds the dust outlet 27. It will be noted that the dust receptacle or bag 45 functions as a dust filter during the accumulation of waste which drops through dust outlet 27 of the primary separator, since air may readily pass from the interior of the bag, through the porous wall thereof, the unfilled space in upper compartment 16 and thence through the screened slots 49 in the doors. The fan outlet pipe 21 passes through the upper compartment and as the bag 45 fills it will shape itself around said pipe and any other obstacles therein and become firmly packed with waste as it accumulates.

Figure 6:
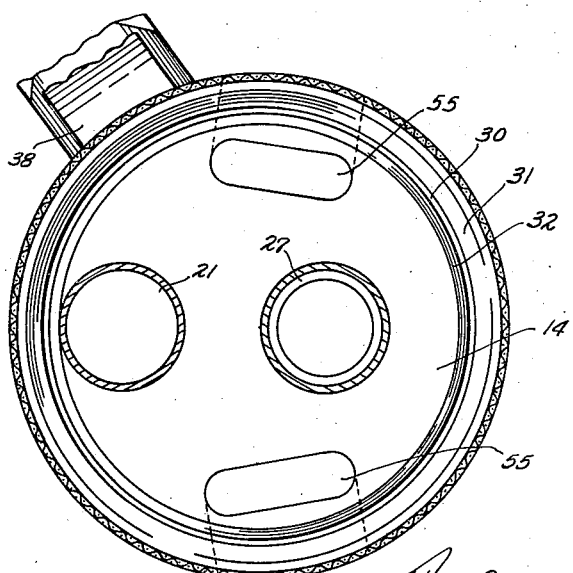
Fig. 6 is a cross-sectional view taken on line 6—6 of Fig. 3.
Figure 5:
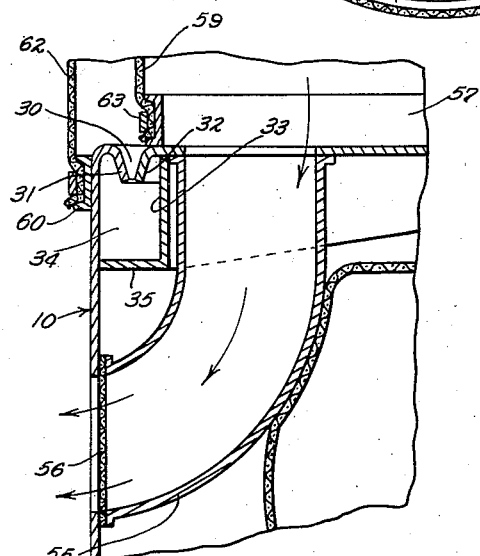
Fig. 5 is an enlarged, cross-sectional view taken on line 5—5 of Fig. 1.
Figure 7:
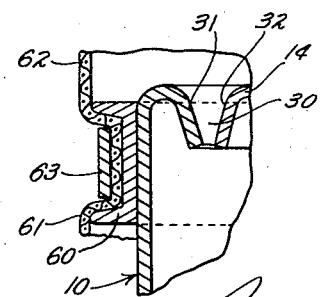
Fig. 7 is an enlarged, cross-sectional view showing the mounting of a filter member of the device.
Figure 8:
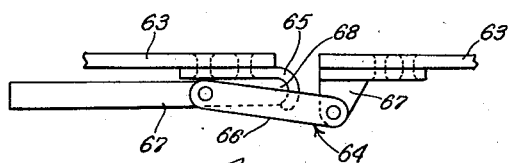
Fig. 8 is a fragmental, top plan view of draw band and its clamping means forming a detail of the invention.

As can be best seen in Figs. 5 and 6 a pair of air escape conduits 55 extend from the top bulkhead 14 to the wall of base 10, these are each provided with a screen 56 which is desirably located closely adjacent the plane of the base wall 10. Referring again to Fig. 5, a channel shaped flange 57 is secured on bulkhead 14 immediately adjacent the downturned flange 32. A corresponding channel-shaped flange 58 is secured on the bottom of plate 25. The mounting flanges 57 and 58 are concentric and of equal diameter and they form means for receiving the opposite ends of a tubular inner filter member 59 which thus isolates the space between itself and the primary separator 24 including its inlet pipe 21 from the outer atmosphere except through air escape conduits 55. On the outer circumference of base 10 immediately adjacent the downturned lip or flange 31 is an annular grooved flange 60 over which the mouth portion 61 of an inverted cylindrical filter bag 62 is passed.

The mouth of the dust bag 45, the mouths at opposite ends of inner filter member 59 and mouth 60 of the outer filter member or bag 62 are retained on their respective grooved flanges by any suitable encircling member, which in an emergency may be simply a cord (not shown) tied tightly into the groove in the preferred form. The securing is effected by a flat flexible securing strap 63 of a length to accommodate the diameter of the selected channel flange and provided at its opposite ends with a draw clamp 64 made up of a hooked keeper 65 fastened on one end of the strap 63 and a complementary member comprising a link 66 pivoted at one end to a bracket 67 fastened on the remaining end of the strap 63. The free moving end of link 66 is pivoted intermediate the ends of a lever member 67, the end 68 of which may enter and leave the keeper 65 freely when said lever is moved to an outwardly extending position. When the lever is pushed to a substantially flush or parallel relation with the strap, the keeper 65 is moved toward the bracket 68 thus drawing the ends of the strip together.

The end 69 of the outer filter or back 62 is likewise made of suitable filter cloth and it is desirably provided with a reenforcing patch 70 directly over the air outlet 26 from the primary separator.

The operation of the device is as follows: It will be assumed that pipe 41 is connected with a dust and waste producing machine which would normally be located closely adjacent the unit dust collector of the invention, and that the damper or valve 42 is in the position shown in Fig. 1 and closing off communication between pipe 38 and valve chamber 39. When the motor 17 is energized, fan 16 will draw a large volume of air at high velocity through pipe 41 through the fan case and thence outwardly through pipe or conduit 21 into the top of centrifugal separator 24. This primary separator functions in known manner to expend the energy of the dirty air stream in circular motion within the separator, thus causing all heavy materials and a very high percentage of the fine dust to travel downwardly and drop out of the dust port 27 of said primary separator and into the receptacle 45. The substantially clean air carrying only a small percentage of the original fine dust content of the air now passes outwardly in the direction of the solid arrows into the space between plate 25 and the end 69 of the outer filter, whereupon the air begins to pass first through the pores of end 69 and then through the pores of the entire surface area of the outer filter 62, and as said air enters the annular space between inner filter 59 and outer filter 62, the air also passes through the pores of said inner filter 59 into the space —between it and the exterior of the primary separator from whence it escapes to the atmosphere through air escape conduits 55 and screen 56. This air is thus thoroughly cleaned and is discharged into the room or shop without any hazard to the health of the occupants.

It will be appreciated that the fine dust remaining between the filters 59 and 62, though very limited in quantity, will eventually accumulate and begin to impair the efficiency of the filter. That portion of the filter dust which drops to the slot 30 may pass into the channel 34 and accumulate there. When the filter is to be cleaned of dust, the damper 42 is moved from the position shown in full lines in Fig. 1 to the dotted line position as indicated, whereupon the suction through pipe 41 is shut off and the air is now caused to recirculate through the path indicated by broken arrows from valve chamber 39 through the fan, through pipe 21 and thence through the primary separator and through the space between the filters 59 and 62 and into the channel 34. The air is drawn from channel 34, through the port 37 and into the by-pass pipe 38. Due to the diminishing cross-section of channel 34 from its port 37 to the point 36 remote from the port, the recirculated air passes through slot 30 at uniform velocity throughout its circumference and the velocity of the recirculating air is thus kept substantially uniform throughout the filter. While the air is thus being recirculated the loosely adhering dust will readily be entrained in the recirculating air stream and again a high percentage of that accumulated dust will be deposited in receptacle 45 by the normal action of the primary separator.

The inner faces of the filters become soiled with accumulated dust represented by the small percentage of material that is not removed by the primary separator. This dust within the filter is desirably removed frequently enough to avoid impairing the efficiency of the unit. The removal of accumulated dust in the bottom and on the walls of the filter is accomplished simply and in an automatic manner without shutting off the power and without shutting off the air flow from the fan to the primary separator. With the unit in operation it is necessary only to manipulate valve 42 between its opposite limits a few times in order to clean the filter and deposit practically all of the removed dust in the dust receptacle 45. While the unit is in normal operation, the pipe 41 and the usual hood of the connected machine beyond (not shown) account for an appreciably large fraction of the total resistance in the air flow circuit and it thus rather definitely determines the number of cubic feet of air per minute constantly entrained in the circuit and being discharged to the atmosphere through the filter walls at a given rate through each square foot of filter surfaces. When valve 42 is closed to shut off pipe 41, the aforesaid fraction of the total normal resistance is lost and the operating characteristic of the motor, fan and primary separator is instantly and automatically changed to handle a proportionally greater number of cubic feet of air per minute. As pipe 38 was opened the entrained air in the unit is recirculated and the entrained air flows through the space between the filter walls. The improved operating characteristic or fan capacity in C. F. P. M. however must be satisfied by an inrush of atmospheric air through every square foot of the filter surfaces in a matter of a second or two of time. The velocity of this inrushing air is higher and its direction is reversed to that of the normal filtering operation. Hence for a brief interval the filter cloth is subjected to a pressure or velocity air cleaning and a slight agitation. The adhering and lodged dust particles are thus liberated and taken into the circulating air stream and a very high percentage of this dust is taken out by the primary separator. By successively opening and closing pipe 41 and thus alternately and automatically changing the conditions as aforedescribed a thorough automatic cleaning of the filter members and the filter trough is effected. The volume of air gained cleans the filter and is cleaned by passing through the primary separator. When the gained volume is lost by a return to normal operation of the unit, that loss is in the form of cleaned air passing through the filters to the atmosphere.

It is to be noted that any other type of primary separator may be employed in lieu of the centrifugal separator as illustrated, and it is further to be noted that the unit is subject to minor variations, within the spirit of the invention and the scope of the appended claims.

What is claimed is:

1. A unit dust collector comprising a hollow base having a top bulkhead, a primary dust separator supported on top of the bulkhead and having a dust outlet at the bottom extending downwardly through said bulkhead into the base, said separator comprising a top plate providing an air outlet at the top of the separator and overhanging a substantial portion of the bulkhead, a tubular filter member connected at its top to said plate and at its bottom to said bulkhead inwardly of the periphery of the bulkhead and encircling said separator in closely spaced relation, an inverted filter bag having the mouth portion removably secured peripherally to the periphery of said bulkhead and enclosing said tubular filter member in closely spaced relation, the air outlet of the primary separator discharging into the space between said top plate and said filter bag and an elbow conduit passing in non-communicating relation through the interior of the base and venting the space between the exterior of the primary separator and the interior of the tubular filter member to the atmosphere.

2. In combination a rigid casing having an intermediate bulkhead and a top bulkhead forming a pair of compartments therein, a motor and fan unit mounted in said lower compartment, said fan provided with an inlet extending through the wall of said rigid casing and having an outlet duct extending upwardly through the bulkheads of said casing, a primary dust separator supported on the upper bulkhead and extending above said rigid casing and having a dust outlet at its bottom passing downwardly into the upper compartment in said rigid casing, a waste receptacle in the upper compartment and removably connected to said dust outlet, a conduit connecting the fan outlet with said primary dust separator, a tubular filter member supported at its top by said primary separator and at its bottom with said rigid casing and forming an air relief space between the primary separator and itself, an inverted filter bag connected at its bottom to the rigid casing and disposed in outwardly spaced relation to said tubular filter casing, the space between the said filter members being in communication with the air outlet of said primary separator.

3. In combination a rigid casing having an intermediate bulkhead and a top bulkhead forming a pair of compartments therein, a motor and fan unit mounted in said lower compartment, said fan provided with an inlet extending through the wall of said rigid casing and having an outlet extending upwardly through the bulkheads of said casing, a primary dust separator supported on the upper bulkhead and extending above said rigid casing and having a dust outlet at its bottom communicating with the upper compartment in said rigid casing, a conduit connecting the fan outlet with said primary dust separator, a tubular dust filter supported at its top by said primary separator and at its bottom with said rigid casing and forming an air relief space between the primary separator and itself, an inverted dust filter bag connected at its bottom to the rigid casing and in outwardly spaced relation to said tubular dust filter member, the space between the said dust filter being in communication with the air outlet of said primary separator and a conduit extending through the top bulkhead, the upper compartment and the outer wall of the rigid casing for venting the air relief space between the tubular dust filter member and the separator to free atmosphere.

4. In a unit dust collector the combination of a hollow rigid base having an upper compartment and a lower compartment in non-communicating relation therein, a power driven dust collector fan in said lower compartment and having an inlet extending through the side wall of the base casing and an outlet duct extending upwardly through the lower and upper compartments, a primary dust separator supported on the top of said base and having an inlet connected with said fan duct and having a dust outlet communicating with the interior of the upper compartment, said primary dust separator having an air outlet at its top, a pair of relatively closely spaced, nested dust filters extending downwardly over and encircling the primary dust collector, the space between said dust filters being in free communication with the air outlet of the primary dust separator, and a dust storage receptacle removably secured about the dust outlet of the primary dust separator within the upper base compartment.

5. An air recirculating unit dust collector comprising a base compartment, a primary dust separator mounted on the top of said base compartment eccentrically thereof and having a dust outlet communicating with the interior of said base compartment, and having an air outlet at the top of said primary dust separator, a pressure fan outlet duct extending upwardly through the top of said base compartment alongside said separator and connecting tangentially with said separator adjacent its top, an inner tubular filter forming a cover for the primary dust separator and secured at its base to said base compartment, plate means at the top of the separator having the air outlet thereof passing through it and peripherally connected with the top end of said filter, an inverted filter bag peripherally secured at its mouth to the circumference of said base at the top thereof, enclosing and in outwardly spaced relation to the inner filter and the top of the separator whereby outlet air from the separator may be dissipated through the inner filter and the filter bag, conduit means extending through the interior of the base compartment and arranged to vent the space within the inner tubular filter to the outside of the base compartment, a removable waste receptacle within the base compartment and connected to the dust outlet of said separator, and a power driven collector fan housed within said base compartment connecting with the outlet duct therein, said fan having its suction inlet extended to the exterior of the compartment for connection with a dust producing means.

6. An air recirculating unit dust collector comprising a base compartment, a primary dust separator mounted on the top of said base compartment eccentrically thereof and having an inlet for dust laden air, a dust outlet communicating with the interior of said base compartment, and having an air outlet at the top of said primary dust separator, spaced concentric filters forming a cover for the primary dust separator and secured at their bases to the top of said base compartment, the space between said filters communicating with the air outlet of the primary dust separator and means comprising a valve controlled pipe to selectively effect communication between the space intermediate said filters and the inlet of primary dust separator.

7. An air recirculating dust collector unit comprising a primary dust separator having an air inlet, a dust outlet and an air outlet, a pair of spaced concentric filters the innermost of which envelopes said separator and has the air outlet passing therethrough, a dust receptacle removably connected to said dust outlet, means connecting the filters at the bottoms thereof and forming a settling channel, and means selectively connecting the interior settling channel with the air inlet of said separator.

8. In a device of the class described the combination of a primary separator having an inlet, a dust outlet at its bottom and an air outlet at its top, a suction fan disposed below the separator and having an upwardly extending outlet duct connected with the inlet of said separator, said fan having an inlet duct for connection with a dust producing device, a removable waste receptacle interposed between the fan and the separator and connected to the dust outlet, a settling channel surrounding the bottom of the separator and duct, a pair of spaced filters extending upwardly from opposite sides of the settling channel and together forming an enclosing cover for the separator and duct, the air outlet of the separator discharging into the space between the filters, and means comprising a valve controlled, by-pass conduit connecting said channel and said inlet duct of the fan.

9. In a unit dust collector the combination of a power driven suction fan having an inlet duct and an upwardly extending outlet duct, a primary separator mounted alongside said outlet duct and above the fan, the separator having an inlet connected with the outlet duct of the fan and further having a dust outlet at its bottom and an air outlet at its top, spaced filter members surrounding the duct and separator and enclosing a filter space, the air outlet of said fan discharging into said filter space, an annular settling channel forming a bottom connection for said filters, a by-pass duct connecting said channel and the fan inlet duct, and a valve disposed at the junction of the fan inlet duct and the by-pass duct for selectively connecting the fan with said by-pass duct and said inlet duct ahead of said by-pass duct.

CHARLES S. HULTON.